United States Patent
Elie-Dit-Cosaque et al.

(10) Patent No.: US 8,274,899 B2
(45) Date of Patent: Sep. 25, 2012

(54) AUTOCONFIGURATION OF ETHERNET OAM POINTS

(75) Inventors: David Elie-Dit-Cosaque, Richardson, TX (US); Kamakshi Sridhar, Plano, TX (US); Maarten Petrus Joseph Vissers, Huizen (NL); Tony Van Kerckhove, Antwerp (BE)

(73) Assignee: Alcatel Lucent, Paris (FR)

( * ) Notice: Subject to any disclaimer, the term of this patent is extended or adjusted under 35 U.S.C. 154(b) by 1126 days.

(21) Appl. No.: 11/020,898

(22) Filed: Dec. 22, 2004

(65) Prior Publication Data
US 2006/0133284 A1    Jun. 22, 2006

(51) Int. Cl.
*G01R 31/08* (2006.01)

(52) U.S. Cl. .................... 370/241.1; 370/242

(58) Field of Classification Search .......... 370/242, 370/241.1, 243.1, 243, 248, 236.2, 216, 469; 709/224

See application file for complete search history.

(56) References Cited

U.S. PATENT DOCUMENTS

| | | | | |
|---|---|---|---|---|
| 6,023,467 | A * | 2/2000 | Abdelhamid et al. | 370/236.2 |
| 6,993,048 | B1 * | 1/2006 | Ah Sue | 370/493 |
| 7,177,325 | B2 * | 2/2007 | Claseman | 370/469 |
| 2003/0058106 | A1 * | 3/2003 | Ikematsu | 340/568.1 |
| 2004/0160895 | A1 * | 8/2004 | Holmgren et al. | 370/223 |
| 2004/0165595 | A1 | 8/2004 | Holmgren et al. | |
| 2004/0184407 | A1 * | 9/2004 | Pok et al. | 370/236 |
| 2005/0099949 | A1 * | 5/2005 | Mohan et al. | 370/236.2 |
| 2005/0099952 | A1 * | 5/2005 | Mohan et al. | 370/241 |
| 2005/0099954 | A1 * | 5/2005 | Mohan et al. | 370/241.1 |
| 2005/0099955 | A1 * | 5/2005 | Mohan et al. | 370/242 |
| 2005/0185576 | A1 * | 8/2005 | Sugawara et al. | 370/216 |
| 2006/0031482 | A1 * | 2/2006 | Mohan et al. | 709/224 |
| 2006/0092847 | A1 * | 5/2006 | Mohan | 370/241.1 |

OTHER PUBLICATIONS

David Elie-Dit-Cosaque, Maarten Vissers "Review of 802.1ag framework" Mar. 12, 2004, AICATEL http://www.ieee802.org/1/files/public/docs2004/Review%20of%20802.1ag%20framework1.pdf.*
Elie-Dit-Cosaque, David et al"Review of 802.1ag Framework", Alcatel, Mar. 12, 2004, XP002346927.
Hiroshi Ohta: "Ethernet OAM Study in ITU-T SG13, Q.3/13—Current Status", ITU-T SG13, Q.3/13, Jul. 12, 2004, XP002366099.
Interworking Task Group of IEEE 802.1: Virtual Bridged Local Area Networks—Amendment 5: Connectivity Fault Managment, IEEE P802.1AG/D1.0, Dec. 3, 2004, XP002366100.
Squire; "Metro Ethernet Forum OAM"; Metro Ethernet Forum; pp. 1-25.
"Making Universal Broadband Access a Reality"; Ethernet in the First Mile Alliance (EFMA); http://www.efmalliance.org/whitepaper.html; pp. 1-14.
"Bringing Carrier-Class Management to Ethernet in the First Mile"; Metrobility Optical Systems; pp. 1-8.

(Continued)

*Primary Examiner* — Michael Thier
*Assistant Examiner* — Awet Haile
(74) *Attorney, Agent, or Firm* — Garlick & Markison; Jessica W. Smith (57) ABSTRACT

A system and method for configuring Maintenance Intermediate Point (MIP) nodes of an Ethernet OAM network based on absolute level indicia as well as relative level indicia encoded in OAM frames generated by Maintenance End Point (MEP) nodes. A first OAM level field in a payload portion of an Ethernet OAM frame is encoded with an absolute OAM level associated with the originating MEP's OAM domain. A second OAM level field is encoded with a relative OAM level indicative of the number of OAM domain levels traversed by the Ethernet OAM frame.

29 Claims, 6 Drawing Sheets

OTHER PUBLICATIONS

"Service delivery technologies for Metro Ethernet Networks"; Nortel Networks; pp. 1-10.

"Layer 2 Protocol Conformance Testing for Ethernet switches"; Net-O2 Technologies; pp. 1-16.

Finn; "Metro Ethernet Connection Management"; IEEE Interim meeting; Jan. 2004; pp. 1-77.

Iwamura; "OAM Flow of Ethernet OAM"; International Telecommunication Union; Feb. 2004; pp. 1-9.

Mohan; "Ethernet OAM Update Overview & Technical Aspects"; Nortel Networks; May 18, 2004; 17 pages.

* cited by examiner

AUTOCONFIGURATION OF ETHERNET OAM POINTS

CROSS-REFERENCE TO RELATED APPLICATION(S)

This application discloses subject matter related to the subject matter disclosed in the following commonly owned co-pending patent application: "SYSTEM AND METHOD FOR REDUCING OAM FRAME LEAKAGE IN AN ETHERNET OAM DOMAIN," application Ser. No. 11/021,642, filed Dec. 22, 2004 in the name(s) of: David Elie-Dit-Cosaque, Kamakshi Sridhar, Maarten Vissers and Tony Van Kerckhove, which is hereby incorporated by reference.

BACKGROUND OF THE INVENTION

1. Technical Field of the Invention

The present invention generally relates to Ethernet OAM networks. More particularly, and not by way of any limitation, the present invention is directed to a system and method for providing autoconfiguration of Ethernet OAM Maintenance Intermediate Point (MIP) nodes.

2. Description of Related Art

The link between the end user and the public network, essential key to the delivery of broadband applications to residential and business subscribers, is known by many names, e.g., first mile, last mile, local loop, metro access, subscriber access network, etc., and is implemented using a variety of different transport technologies and protocols over diverse physical connections. For instance, today most users connect to the public network with Digital Subscriber Line (DSL), Integrated Services Digital Network (ISDN), cable TV, T1/E1 or T3/E3 lines, using Synchronous Optical Network and its companion Synchronous Digital Hierarchy (SONET/SDH), Frame Relay and Asynchronous Transfer Mode (ATM). Regardless of the nomenclature or the actual implementation, all access networks require operations, administration and maintenance (OAM) support features to ensure the maintainability and uptime required to provide broadband services.

Current first/last mile solutions have significant shortcomings from the customer's perspective, ranging from performance bottlenecks, fixed bandwidth provisioning, limited scalability, lack of flexibility and provisioning complexity to end-to-end quality of service (QoS) issues and a high cost structure. The use of robust, simple Ethernet technology in the first mile promises to revolutionize the access network as it did the enterprise network. Ethernet is a local area network (LAN) transport technology that is used ubiquitously in the home and in business to communicate between computers and networks. As an access technology, Ethernet offers three significant advantages over legacy first mile technologies: (i) future-proof transport for data, video and voice applications; (ii) cost-effective infrastructure for data services; and (iii) simple, globally accepted standard that will ensure interoperability.

In order to adapt the Ethernet technology in a carrier-grade service environment, various standards are being developed that aim to provide advanced OAM capabilities (also referred to as Ethernet Connectivity and Fault Management or Ethernet CFM) across the entire network from one end to the other end. Since the end-to-end service network environment is typically comprised of a patchwork of diverse component networks (e.g., metro access networks and core networks using a variety of technologies) that may belong to different organizations, network operators and service providers, the Ethernet OAM plane is envisioned as a hierarchically layered domain space wherein specific OAM domains are defined corresponding to the constituent network infrastructure and provisioning. In particular, two standards, IEEE 802.1ag and ITU-T (Question 3, Study Group 13), incorporated by reference herein, that are specifically concerned with end-to-end Ethernet OAM define a customer-level domain at the highest level of hierarchy, which comprises one or more provider domains (occupying an intermediate level), each of which in turn includes one or more operator domains disposed at a lower hierarchical level. By way of standardization, the OAM domain space may be partitioned into up to a number of levels, e.g., 8 levels, each domain corresponding to a particular level, wherein a domain is defined in terms of what are referred to as flow points. In the context of the IEEE 802 specification suite, the flow points are new entities contained in Media Access Control (MAC) "interfaces" and "ports" as defined in related standards documentation. A port can implement multiple flow points, of different types. A flow point at the edge of an OAM domain is called a "Maintenance End Point" or MEP. A flow point inside a domain and visible to a MEP is called a "Maintenance Intermediate Point" or MIP. Whereas MEP nodes are used by system administrators to initiate and monitor OAM activity (by issuing appropriate OAM frames), MIP nodes passively receive and respond to OAM flows initiated by MEP nodes.

An OAM domain having one or more MIP nodes is bounded by a pair of MEP nodes. In order that OAM frame flows are appropriately filtered so that they are processed only by the intended domain's nodes, the MEP/MIP population of an Ethernet OAM network needs to be properly configured. In accordance with the current standards, absolute OAM level encoding uses an integer value to indicate a specific domain level. Moreover, each MIP node at a given layer must be manually configured with its domain level in order to support proper OAM operation. Manual configuration can however be time-consuming as well as error-prone, particularly in a network with many levels and a large number of MIP nodes. If the MIP nodes are misconfigured for any reason with the wrong domain level, or if a MEP node is malfunctioning, security violations are possible due to leakage of OAM frames between domains.

SUMMARY OF THE INVENTION

In one embodiment, a scheme is disclosed for configuring MIP nodes disposed in an Ethernet OAM network. Absolute level indicia associated with MEP nodes of the Ethernet OAM network are initially configured based on the OAM domain levels of the MEP nodes. The MEP nodes initiate OAM frames having an absolute level indicium and a relative level indicium encoded therein. Depending on how many OAM domain levels are traversed, an OAM frame's relative level indicium is appropriately offset. When an OAM frame arrives at a particular MIP node, the MIP node's absolute level indicium is deduced based on the OAM frame's absolute level and relative level indicia.

In another embodiment, the present invention is directed to a method of providing OAM level information in an end-to-end Ethernet network having multiple levels of OAM domains. A first OAM level field in a payload portion of an Ethernet OAM frame is encoded with an absolute OAM level associated with the originating MEP's OAM domain. A second OAM level field is encoded with a relative OAM level indicative of the number of OAM domain levels traversed by the Ethernet OAM frame.

In a still further embodiment, the present invention is directed to an error detection system and method operable in an Ethernet OAM network having a plurality of MEP nodes and MIP nodes organized into multiple levels of OAM domains. As summarized before, the MIP nodes are configured based on absolute level indicia and relative level indicia encoded in OAM frames generated by the MEP nodes. Upon arrival of an OAM frame at an MIP node, a comparison is made to compare the MIP node's absolute level indicium with the OAM frame's encoded absolute level indicium. An error may be generated and notified upon determining that the OAM frame's encoded relative level indicium equals a value other than zero and the MIP node's absolute level indicium equals the OAM frame's encoded absolute level indicium.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
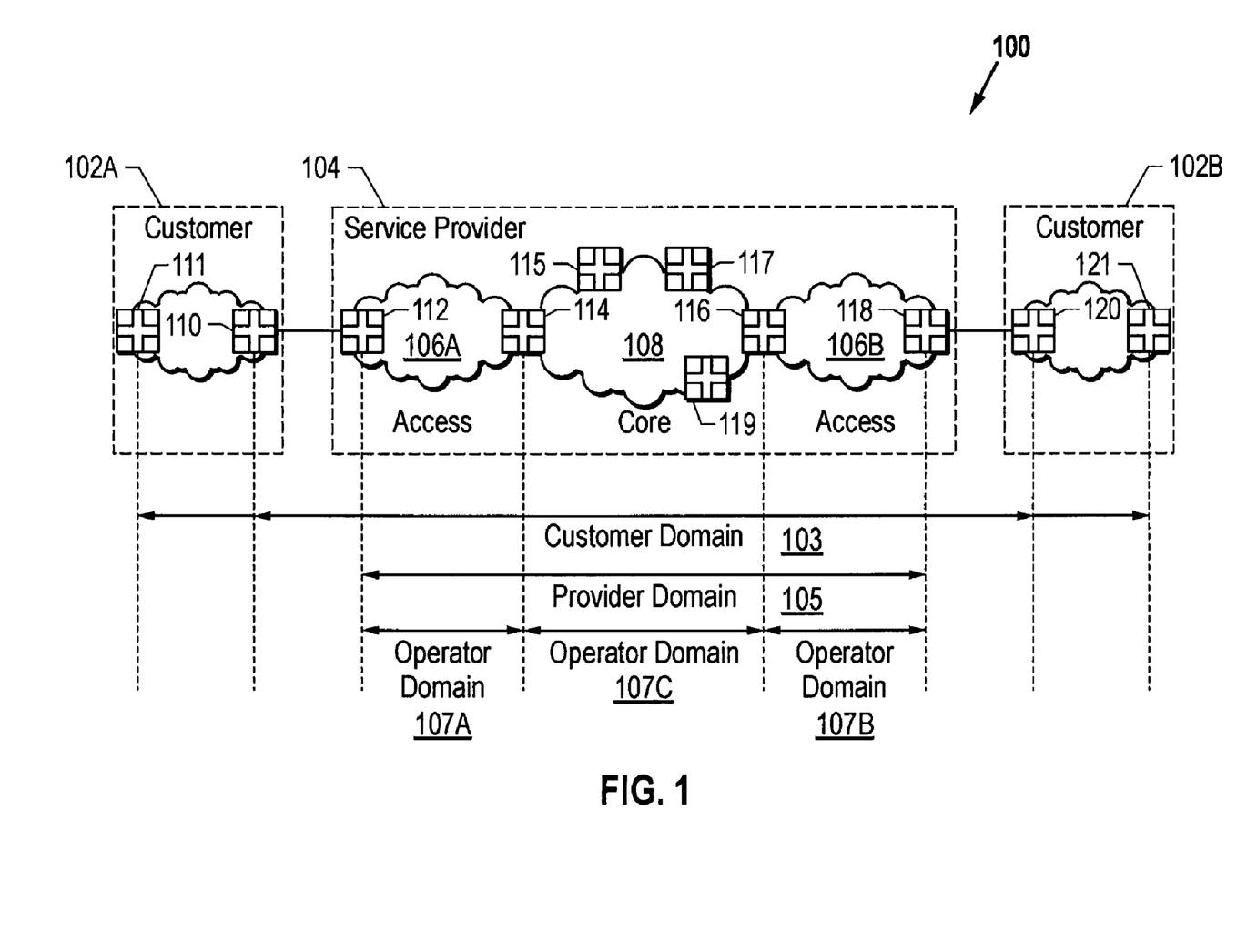
FIG. 1 depicts an embodiment of an end-to-end Ethernet OAM network having a plurality of OAM domains.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an embodiment of an end-to-end Ethernet OAM network 100 having a plurality of OAM domains wherein an autoconfiguration scheme for MIP nodes may be provided in accordance with an aspect of the present invention. As illustrated, the Ethernet OAM network 100 is comprised of a hierarchically layered network environment including a first customer premises network 102A and a second customer premises network 102B that form the terminal portions thereof, which in turn are connected by means of respective access networks 106A and 106B to a core transport network 108. Whereas a single service provider may administer the provisioning of end-to-end service between the two customers, one or more operators may in fact be involved in providing and maintaining the underlying network infrastructure. Accordingly, the access and core networks may comprise various diverse network and transport technologies and protocols for effectuating an end-to-end carrier-grade Ethernet service between the terminal customer networks 102A and 102B. For example, these assorted technologies may include Ethernet over SONET/SDH, Ethernet over ATM, Ethernet over Resilient Packet Ring (RPR), Ethernet over Multiprotocol Label Switching (MPLS), Ethernet over Internet Protocol (IP), etcetera.

The various network portions of the Ethernet OAM network 100 and their constituent segments are interconnected using appropriate forwarding entities such as bridges and switches. By way of illustration, entities 111, 110 and 120, 121 are exemplary of customer equipment disposed in the respective customer networks 102A and 102B. Likewise, entities 112 and 118 of access networks 106A and 106B are operable to interface with the respective customer equipment 110 and 120. Interfacing between the access networks 106A, 106B and the core network 108 is effectuated by means of entities 114 and 116, respectively. In addition to the interfacing entities, a particular network may include a number of additional entities within that network. For example, entities 115, 117 and 119 are exemplary equipment within the core network 108, wherein point-to-multipoint operations may be effectuated.

As alluded to in the Background section of the present patent application, the Ethernet OAM architecture of a hierarchically layered end-to-end carrier-grade Ethernet service network such as the Ethernet network 100 is logically segmented into a number of OAM domains having a designated hierarchy of domain levels. With respect to the Ethernet OAM network 100 of FIG. 1, a customer domain 103, a provider domain 105 and one or more operator domains 107A-107C are exemplified, each of which is bounded by multiple MEP nodes and includes one or more MIP nodes disposed therebetween. Whereas MEP nodes are operable to initiate various OAM commands and associated frames, e.g., Continuity Check (CC), TraceRoute, Ping, etcetera, MIP nodes passively receive and respond to the incoming OAM frames based on domain-level compatibility.

It should be appreciated by those skilled in the art that by virtue of MEP and MIP provisioning, a static partitioning of the Ethernet OAM network is effectuated whereby MEP nodes demarcate the boundaries of nonintersecting Ethernet domains such that OAM frame leakage from one domain to another is curtailed. That is, OAM frames intended for one domain are required to stay within that domain for processing while all other OAM frames are filtered out. Further, MEP and MIP nodes are provisionable within an Ethernet OAM network such that it is possible to define a number of easily manageable Maintenance Entity (ME) domains depending on business and service models and deployment scenarios. Due to the hierarchical arrangement of the OAM domains, customer-level domains are disposed at a higher hierarchical level than the service provider domains, which in turn are disposed at a higher level than operator-level domains. Accordingly, in terms of visibility and awareness, operator-level domains have higher OAM visibility than service provider-level domains, which in turn have higher visibility than customer-level domains. Thus, whereas an operator OAM domain has knowledge of both service provider and customer domains, the converse is not true. Likewise, a service provider domain has knowledge of customer domains but not vice versa.

As set forth in the IEEE 802.1ag specification documentation referenced hereinabove, various rules govern the treatment of Ethernet packets/frames as they move from one domain level to another. MEP nodes are operable to issue OAM frames to all other MEP nodes across the level/OAM domains, while an MIP node can interact only with the MEP nodes of its domain. Each MIP node at a higher domain level is also operable as a MEP node for the next hierarchical layer below. Thus a single piece of forwarding entity equipment (e.g., a bridge) may have both MIP and MEP nodes thereat that are of different levels. Because of the boundedness of OAM flows, frames at a given level i, i=1, 2, ..., N, remain at that level. As will be explained in detail hereinbelow, the levels of OAM frames are encoded therein depending on the domain levels assigned to the MEP nodes originating the OAM frames. Further, OAM frames are either processed or discarded by the same level MIP/MEP nodes subject to the following conditions: (i) an OAM frame is discarded when originated from outside the instant OAM domain, and (ii) an OAM frame is processed when originated within the instant OAM domain. Due to the hierarchical nature of OAM visibility, frames from lower maintenance domain levels (e.g., operator) are relayed transparently by MEP/MIP nodes disposed at higher domain levels (e.g., customer). On the other hand, higher domain OAM frames (e.g, originated by customer-level MEP nodes) are always processed by lower level MEP/MIP nodes (e.g., operator-level nodes).

Figure 2:
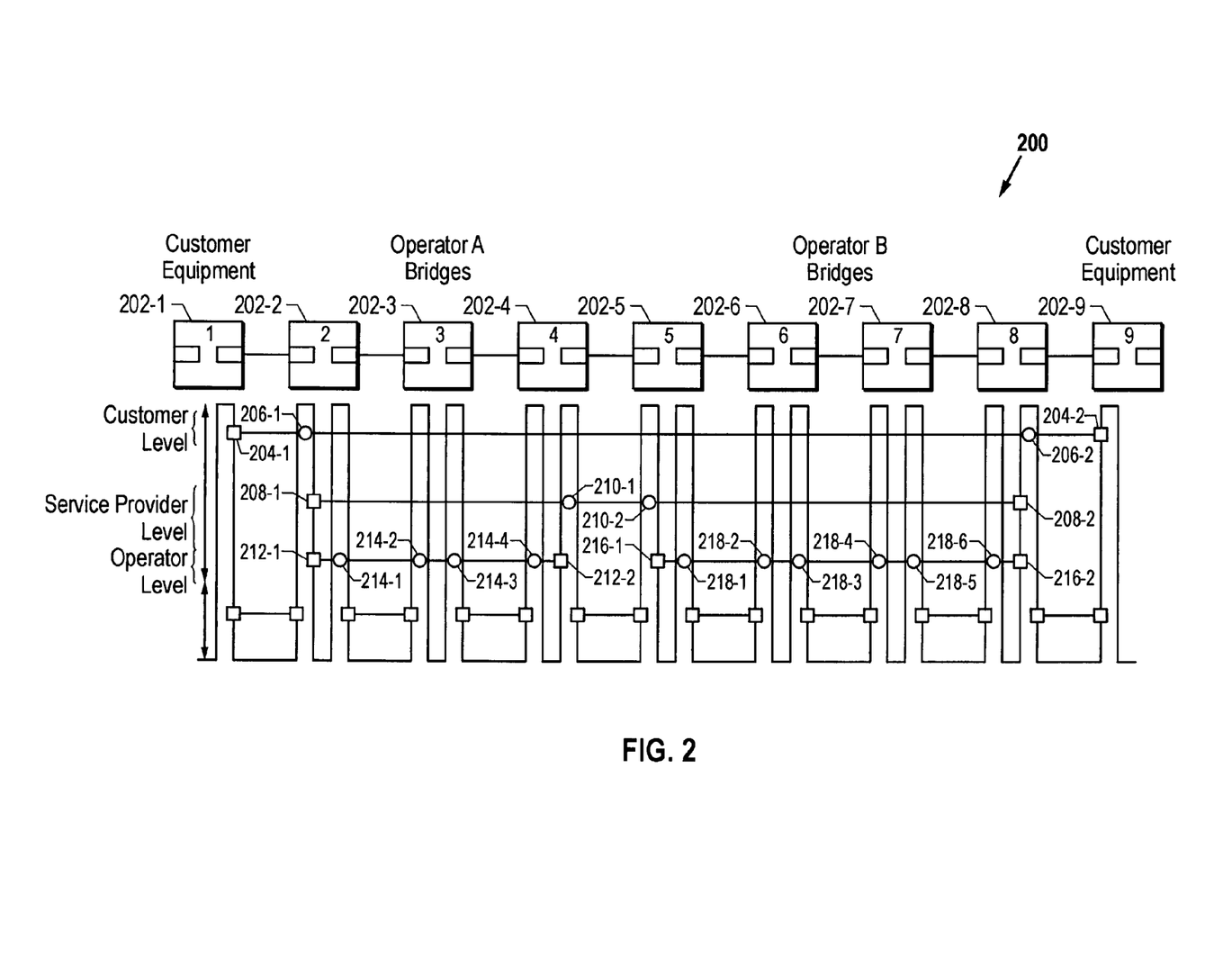
FIG. 2 depicts an exemplary hierarchical OAM layering scheme operable with respect to an end-to-end Ethernet network.

FIG. 2 depicts an exemplary hierarchical OAM layering scheme 200 operable with respect to an end-to-end Ethernet network such as e.g., network 100 shown in FIG. 1, wherein a plurality of Ethernet bridges are illustrative of forwarding entities having MIP/MEP nodes at different domain levels. Reference numerals 202-1 and 202-9 refer to customer bridge equipment disposed at the two ends of the network. Two operator networks, Operator-A and Operator-B, are deployed between the customer equipment 202-1 and 202-9, wherein Operator-A network comprises bridges 202-2 through 202-4 and Operator-B network comprises bridges 202-5 through 202-9. At customer level, the OAM domain is bounded by MEP nodes 204-1 and 204-2 effectuated at customer bridge equipment 202-1 and 202-9, respectively, which includes two MIP nodes 206-1 and 206-2 that are effectuated at Operator-A bridge 202-2 and Operator-B bridge 202-8, respectively. Beneath the customer-level MIP nodes 206-1 and 206-2 are disposed two MEP nodes 208-1 and 208-2, also effectuated at Operator-A bridge 202-2 and Operator-B bridge 202-8, respectively, that bound the service provider-level OAM domain. Within this domain, an MIP node 210-1 effectuated at Operator-A bridge 202-4 is interfaced with another MIP node 210-2 effectuated at Operator-B bridge 202-5. Two operator-level domains are defined that correspond to the two operator networks, wherein operator-level MEP nodes 212-1 (effectuated at Operator-A bridge 202-2) and 212-2 (effectuated at Operator-A bridge 202-4) bound one operator domain and operator-level MEP nodes 216-1 (effectuated at Operator-B bridge 202-5) and 216-2 (effectuated at Operator-B bridge 202-8) bound the other operator domain. Further, MIP nodes 214-1 through 214-4 are disposed in the operator-level domain defined by the MEP nodes 212-1 and 212-2, wherein bridge 202-2 effectuates MIP node 214-1, bridge 202-3 effectuates MIP nodes 214-2 and 214-3, and bridge 202-4 effectuates MIP node 214-4. Likewise, MIP nodes 218-1 through 218-6 are disposed in the operator-level domain defined by the MEP nodes 216-1 and 216-2, wherein bridge 202-5 effectuates MIP node 218-1, bridge 202-6 effectuates MIP nodes 218-2 and 218-3, bridge 202-7 effectuates MIP nodes 218-4 and 218-5 and, finally, bridge 202-8 effectuates MIP node 218-6.

Figure 3:
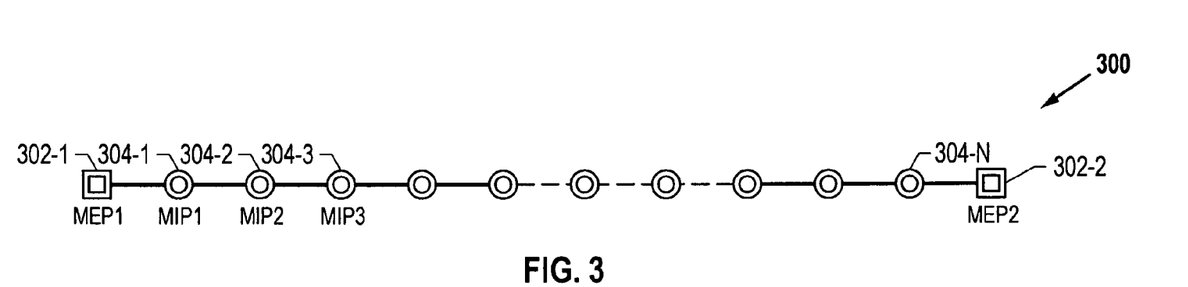
FIG. 3 depicts an exemplary embodiment of an OAM domain bounded by a pair of MEP nodes.

Based on the foregoing discussion, it should be apparent that a single network entity may be operable to effectuate one or more MIP/MEP nodes at different levels depending on its deployment and OAM service provisioning. By way of illustration, it can be seen that bridge entity 202-2 effectuates the processing and logic of customer-level MIP node 206-1, service provider-level MEP 208-1, operator-level MEP 212-1 as well as operator-level MIP 214-2. Accordingly, the physical equipment of an Ethernet network represents a flat, "vertically-compressed" layer that is logically expandable into a number of hierarchical levels where, at any one level, an OAM domain may be abstracted as a concatenation of a plurality of MIP nodes bounded by multiple MEP nodes. In essence, FIG. 3 depicts such an exemplary embodiment of an OAM domain 300 including MIP nodes 304-1 through 304-N that are bounded by a pair of MEP nodes 302-1 and 302-2, which represents a particular case of point-to-point operation. It will be realized that in the point-to-multipoint case, more than two MEPs are provided to bound the OAM network (as seen, e.g., in the core network portion 108 of FIG. 1).

As alluded to hereinabove, MEP nodes are operable to originate various OAM frames which may be used for effectuating such OAM service functions as discovery, connectivity verification, latency/loss measurements, delay variation measurements, etcetera, within an end-to-end Ethernet network. In general, the OAM frames are issued on a per-Ethernet Virtual Connection (per-EVC) basis and look like user data frames, but differentiated by using (i) certain predetermined multicast addresses for OAM discovery and (ii) certain predetermined EtherTypes for OAM. Also, because Ethernet as a connectionless transport technology has the property that packets may be sent to different entities within the network that need not or should not receive them (e.g., when the MAC address is not known), domain-based OAM barriers or filters are also encoded therein.

Figure 4:
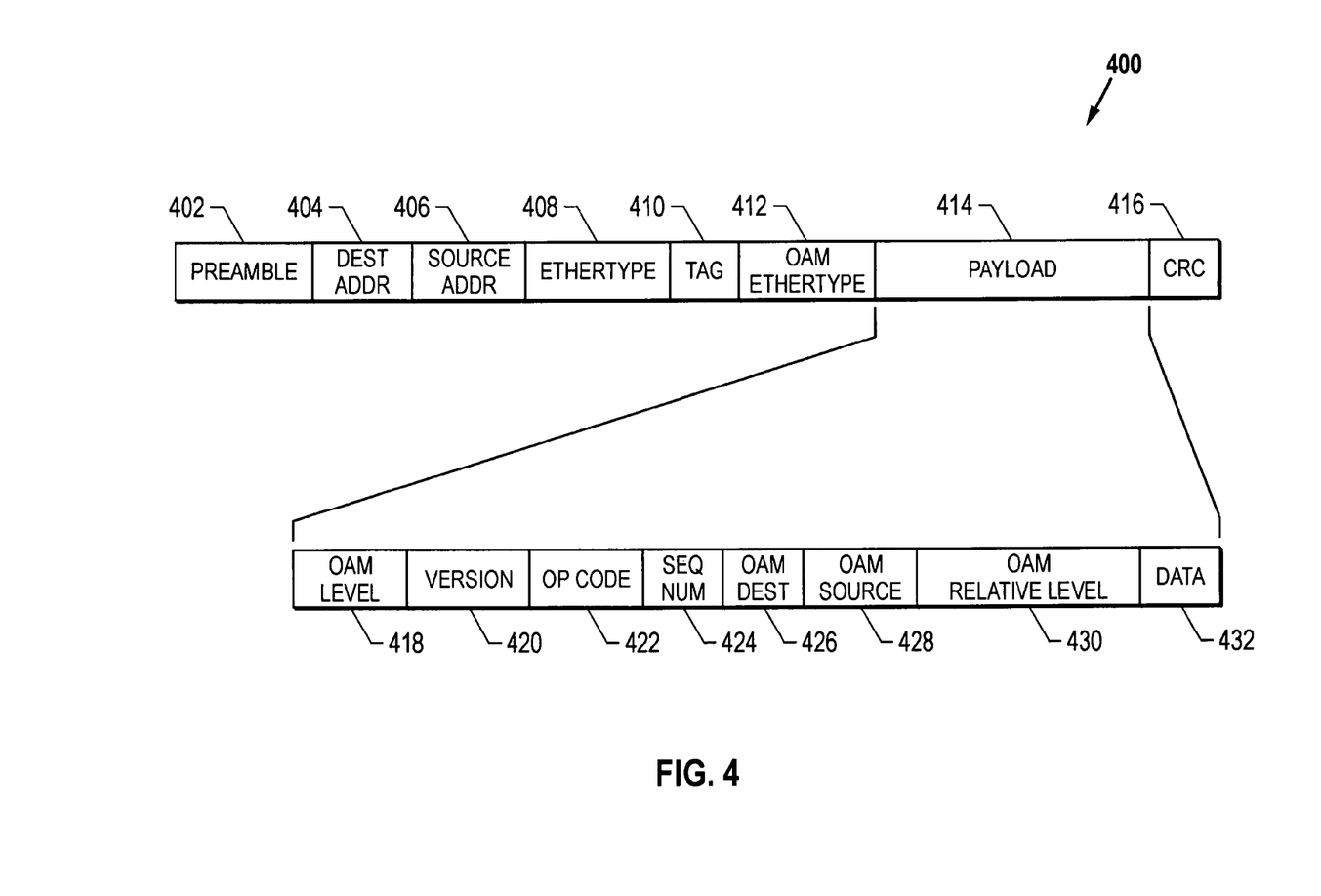
FIG. 4 depicts an OAM frame having absolute OAM level and relative OAM level fields according to one embodiment of the present invention.

FIG. 4 depicts an OAM frame 400 having absolute OAM level and relative OAM level fields, i.e., first OAM level and second OAM level fields, respectively, according to one embodiment of the present invention. A number of fields such as preamble 402, destination and source MAC addresses 404 and 406, Virtual LAN (VLAN) EtherType 408, VLAN tag 410, OAM EtherType 412 and a cyclic redundancy check (CRC) field 416 are provided along with a data payload 414 of a plurality of bytes. The destination MAC address 404 can include a multicast MAC address (e.g., for TraceRoute and Connectivity Check) or a unicast address (for Loopback). Within the data payload 414, a number of sub-fields are provided for effectuating OAM functionality. An OAM level field 418 encodes the absolute level of the originating MEP's domain. A version field 420 is operable to specify the particular version of the OAM protocol being used. A sequence number field 424 is useful for detecting if an OAM frame is out of order in a message unit. Also provided are OAM destination and OAM source fields 426 and 428, wherein the destination field 426 encodes the address of the MEP or MIP being tested and the source field 428 encodes the address of the MEP or MIP sending the OAM frame. A data field 432 which may include padding (thereby allowing OAM frames to have variable sizes) is operable to specify the OAM operation being performed (e.g., Ping, CC, TraceRoute, Loop Detection, Error messaging, etc.). Additional fields may also be provided in the OAM frame 400 or in any region thereof depending on specific implementation and applicable standards.

An opcode field 422 is provided to indicate that a receiving node's processing logic is required to interrogate an additional field, designated as OAM relative level 430, in the payload 414, to determine a relative level indicium encoded therein. As will be explained in greater detail hereinbelow, the value of a relative level indicium is successively incremented or decremented (i.e., offset) with respect to an absolute level so as to indicate how many net OAM domain boundaries a particular OAM frame has traversed as it progresses from the originating MEP. In one implementation, the opcode field 422 may be provided as a vendor-specific or equipment-specific field which enables the MIP nodes effectuated by network equipment from a particular vendor to transparently effectuate autoconfiguration of the MIP nodes by determining the absolute levels thereof based on the absolute levels as well as relative levels encoded in the OAM frames in accordance with an embodiment of the present invention. In another implementation, if the opcode 422 is not provided, the relative level fields of the OAM frames are not interrogated and, accordingly, the MIP nodes are not automatically configured. Furthermore, in order to support interoperability and transparency, it may be provided that if an unknown opcode in OAM frames is encountered by an MIP, such condition does not cause the frames to be dropped. In other words, MIP nodes not recognizing a particular opcode may simply transparently forward the OAM frames received thereat.

As set forth above, the absolute level field 418 indicates the domain level (i.e., absolute level indicium) of the MEP node originating the frame. On the other hand, the offset value provided as a relative level indicium indicates whether OAM originated from the current absolute level or from an outside level (i.e., outside the current OAM domain). Whereas the MEP nodes of an Ethernet network are configured with the absolute level indicia depending on which OAM domains they are provisioned to occupy, the originating MEP nodes are operable to insert a value of 0 (i.e., Level 0) as the relative level indicium in the relative level field 430. In order to maintain the net effect of OAM boundary traversal, the relative level indicium of an OAM frame is incremented by a positive offset when the OAM frame encounters a MEP source and crosses the OAM domain boundary thereat (i.e., traversal in one direction of the hierarchy) and is decremented by a negative offset when the OAM encounters a MEP sink crosses the OAM domain boundary thereat (i.e., traversal in the other direction of the hierarchy). In an exemplary embodiment, the values of positive and negative offsets are dependent upon the values of the absolute level indicia associated with the OAM domains. In another embodiment, the offset values may follow a sequential arithmetic progression (i.e., offsets of 1) where the absolute level indicia also follow a corresponding incremental/decremental progression.

Figure 5:
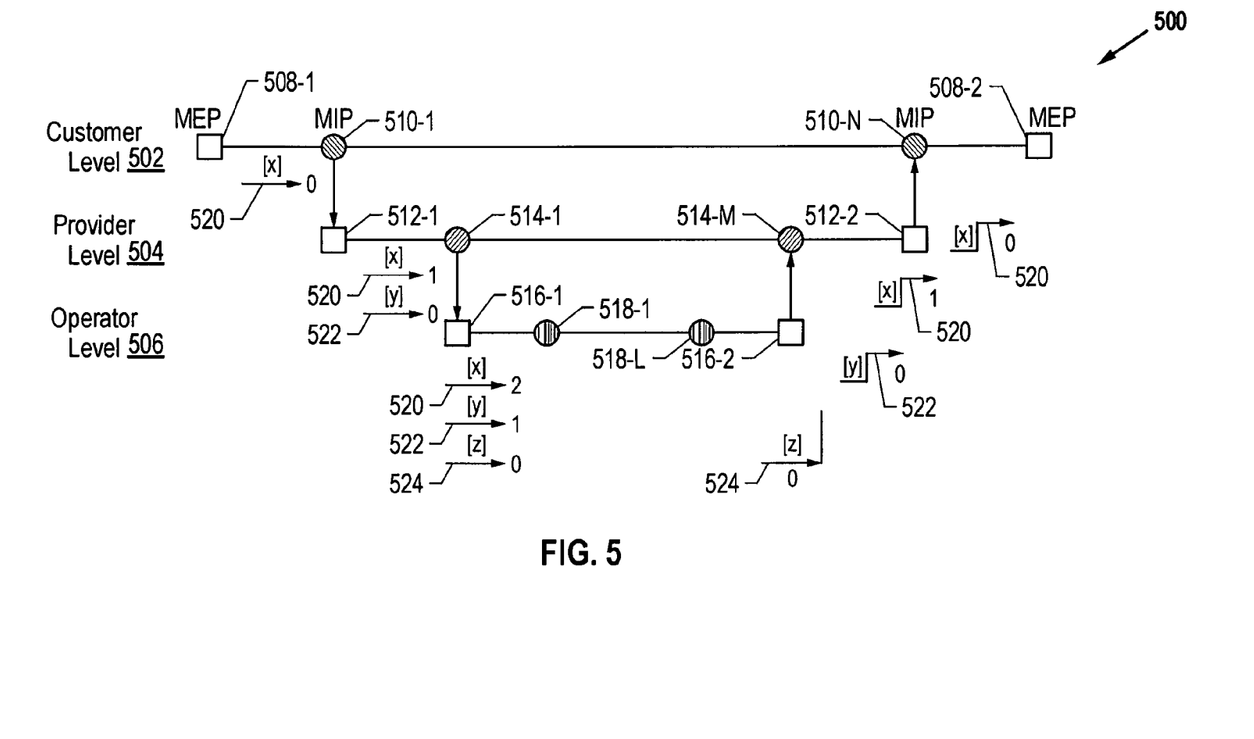
FIG. 5 depicts a scheme demonstrating how relative level indicia of OAM frames are successively offset depending on the number and direction of OAM domains traversed.

FIG. 5 depicts a schematic arrangement 500 demonstrating how relative level indicia of OAM frames are successively offset depending on the number and direction of OAM domains traversed. Three OAM domain levels are exemplified: a customer level 502, a provider level 504, and an operator level 506, in the descending order of OAM hierarchy. As illustrated, the customer domain level 502 is comprised of a number of MIP nodes 510-1 through 510-N that are bounded by MEP nodes 508-1 and 508-2. The provider domain level 504 is defined by a pair of MEP nodes 512-1, 512-2 that are interfaced to the higher-level customer MIP nodes 510-1 and 510-N, respectively. The provider MEP nodes 512-1 and 512-2 in turn bound a plurality of MIP nodes 514-1 through 514-M. In similar fashion, the operator domain level 506 is defined by MEP nodes 516-1, 516-2 that interface with the provider MIP nodes 514-1 and 514-M, respectively. A number of operator MIP nodes 518-1 through 518-L are provisioned as part of the operator domain level 506.

By way of illustration, customer-level MEP node 508-1 originates a frame [X] 520 having a particular absolute level indicium, wherein the relative level field is encoded with the relative level indicium of 0. As it encounters MIP 510-1, it goes down one level below to the provider-level MEP node 512-1 that acts as a MEP source in that domain. Accordingly, the relative level indicium of the frame [X] gets incremented by 1 as it progresses through the provider domain. Another frame, frame [Y] 522, originated by the provider-level MEP node 512-1 and having its own absolute level indicium of certain value and its own relative level indicium equaling 0, is also propagated in the domain. When both frames encounter MIP node 514-1, they are provided to the lower domain MEP node 516-1 of the operator level 506, whereupon the relative level indicia of [X] and [Y] frames are incremented by 1 each, since MEP node 516-1 operates as a source. Accordingly, frame [X] 520 and frame [Y] 522 in the operator level domain are encoded with relative level indicia of 2 and 1, respectively. A third frame, frame [Z] 524, is originated by MEP node 516-1 and thus includes a relative level indicium of 0.

When the frames arrive at MEP node 516-2 in the operator level domain 506, frame [Z] 524 is processed thereat, whereas frames [X] and [Y] are transparently passed to the next higher level, i.e., the provider level 504. Since MEP node 516-2 operates as a sink, the relative level indicia of [X] and [Y] frames are offset by −1 each, i.e., decremented by 1. Thus, [X] and [Y] frames with relative level indicia of 1 and 0, respectively, are propagated into the provider domain. Upon reaching the provider MEP node 512-2 which operates as a sink, frame [Y] 522 is processed while frame [X] 520 is passed through to the next higher level, i.e., the customer level 502. The relative level indicium of frame [X] 520 is therefore offset by −1 (i.e, decremented by 1), bringing the encoded relative level indicium to 0. Accordingly, frame [X] 520 is processed by the MIP/MEP nodes of the customer level 502 as intended.

It should be appreciated by those skilled in the art that the MIP nodes are operable to deduce their absolute level indicia in an autoconfiguration learning phase by back-calculating from the arriving OAM frames' absolute level indicia and relative level indicia. For example, if an OAM frame (a CC frame or a TraceRoute frame) arrives at an MIP node with an absolute level indicium of 61 and a relative level indicium of 0, then the absolute level indicium for that MIP node is also 61. If an OAM frame arrives at an MIP node with an absolute level indicium of 61 and a relative level indicium of 2, then the absolute level indicium for that MIP node is 59. In general, during the autoconfiguration phase, if an incoming OAM's absolute level indicium is X and its relative level indicium or offset is *, then the receiving MIP node's absolute level indicium is calculated as |X−*|.

Figure 6:
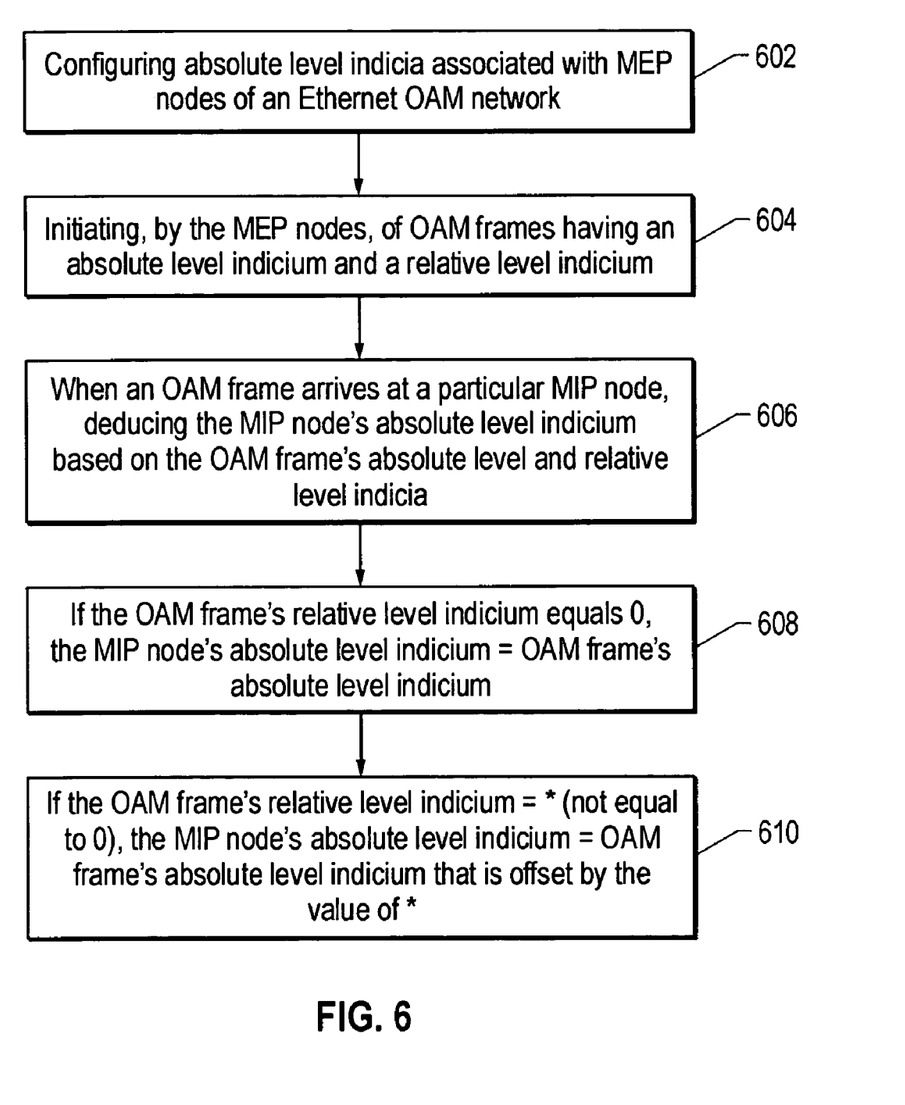
FIG. 6 is a flow chart of a configuration method for configuring MIP nodes of an Ethernet OAM network according to one embodiment of the present invention.

These operations are concretized as a flow chart in FIG. 6 wherein a configuration method for configuring MIP nodes of an Ethernet OAM network is provided according to one embodiment of the present invention. Absolute level indicia associated with MEP nodes of an Ethernet OAM network are first configured upon initialization (block 602). In one implementation, the MEP nodes are configured manually based on the OAM levels of the network (e.g., 0 to 255). Thereafter, the MEP nodes initiate OAM frames (e.g., CC or TraceRoute frames) at known periodic intervals that have an absolute level indicium encoded therein. Also encoded therein is the relative level indicium of 0, which may be incremented by a positive offset based on OAM boundary traversal as described above (block 604). When an OAM frame arrives at a particular MIP node, the MIP node's absolute level indicium is deduced based on the OAM frame's absolute level and relative level indicia (block 606). If the relative level indicium equals 0, then the MIP node's absolute level indicium equals the OAM frame's absolute level indicium (block

608). Otherwise, the MIP node's absolute level indicium comprises a value equaling the OAM frame's absolute level that is offset by the encoded relative level indicium * (block 610).

Figure 7:
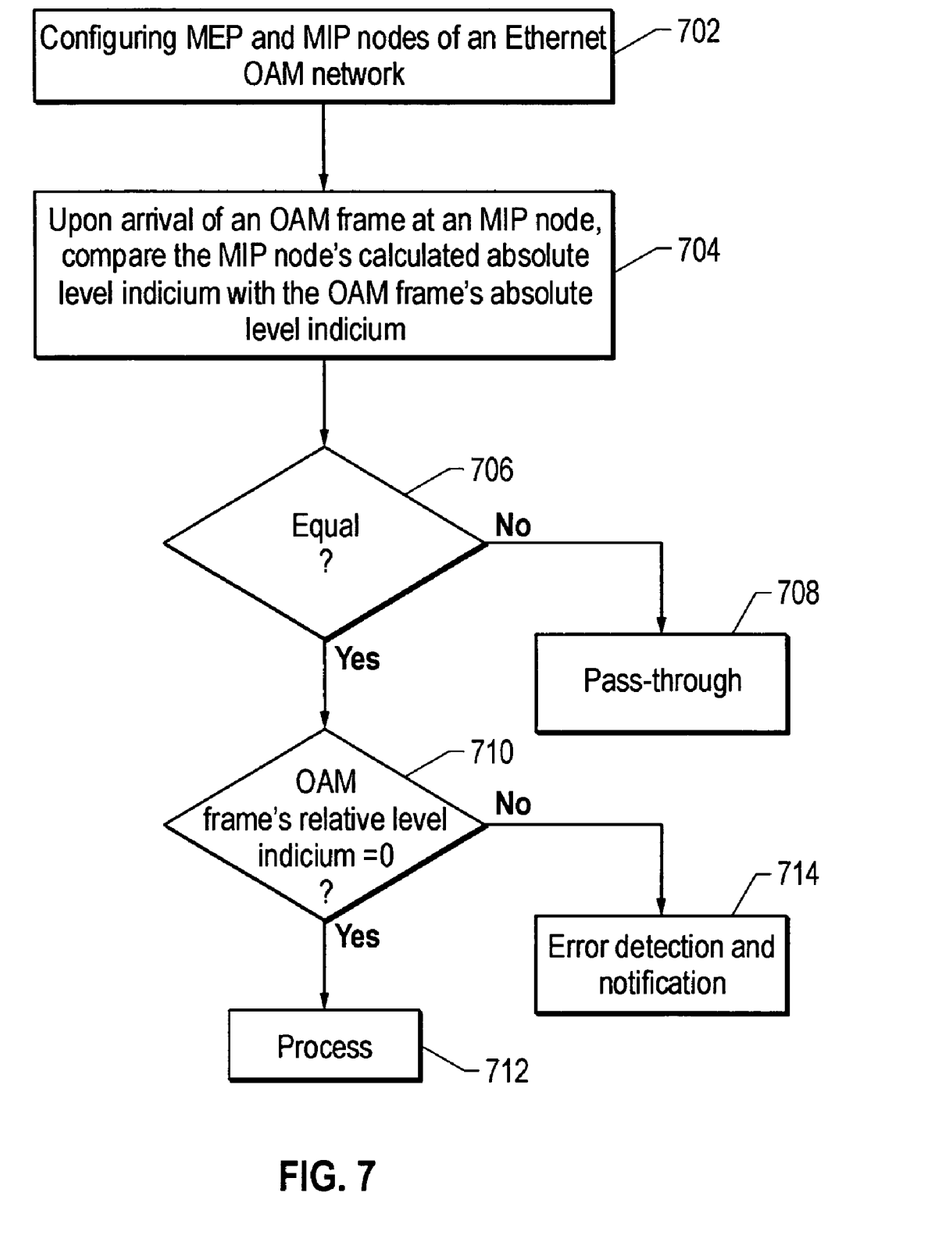
FIG. 7 is a flow chart of an error detection method operable in an Ethernet OAM network according to one embodiment of the present invention.

Upon completion of the autoconfiguration learning phase (which may be based on a predetermined timeout condition, e.g., 10 seconds), each MIP is aware if its calculated absolute level. Subsequently, both relative level and absolute level indicia encoded into the OAM frames may used by a processing MIP or MEP node to detect if there is a frame leakage error due to misconfiguration, equipment failure, etcetera. FIG. 7 is a flow chart of an error detection method operable in an Ethernet OAM network according to one embodiment of the present invention. As set forth above, the MEP and MIP nodes of the network are configured so that each node is aware of its absolute level (either manual configuration or autoconfiguration) (block 702). Upon arrival of an OAM frame at an MIP node, the MIP node's absolute level indicium is compared against the incoming OAM frame's absolute level indicium (block 704). If the two absolute level indicia are not equal (decision block 706), indicating that the OAM frame is intended for a different domain, the frame is passed through (block 708). Otherwise, depending on the provisioning of the relative level opcode in the OAM frame, the relative level field is interrogated (decision block 710) to determine the relative level indicium. If the relative level indicium is equal to 0, the frame is processed normally because it is intended for the domain (block 712). On the other hand, if the OAM frame's relative level indicium has a nonzero value, it is indicative of some sort of a mistake because the relative level indicium denotes that the frame was issued from a different domain whereas the absolute level indicium being the same as the MIP's level denotes that the frame was intended for the MIP's domain. Such a situation can arise where a MEP was skipped (and hence the relative level indicium was not decremented by an appropriate offset) due to, for example, MEP misconfiguration or equipment failure. Accordingly, suitable notification and alarms may be issued to trigger further actions upon error detection (block 714).

Based on the foregoing Detailed Description, it should be appreciated that the present invention advantageously provides a configuration mechanism for MIP nodes in an Ethernet OAM domain wherein the MIP nodes are configured automatically rather than by way of manual configuration. Thus, the possibility of mistakes due to manual misconfiguration is significantly reduced, especially in OAM domains provisioned with a large number of MIP nodes. Moreover, security violations due to leakage of frames from one domain to another are reduced because of the provisioning of both absolute level and relative level indicia in the OAM frames. Additionally, the teachings set forth herein also apply in the case where the absolute levels decrease from the customer domain to the provider domain to the operator domains. In this case, the relative level indicium of an OAM frame is decremented by a negative offset when the OAM frame encounters a MEP source and crosses the OAM domain boundary thereat (i.e., traversal in one direction of the hierarchy) and is incremented by a positive offset when the OAM encounters a MEP sink crosses the OAM domain boundary thereat (i.e., traversal in the other direction of the hierarchy). However, this case is not described in detail, since the principles of the present invention equally apply, *mutatis mutandis*, as in the other case.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A method of configuring domain hierarchical levels of Maintenance Intermediate Point (MIP) nodes disposed in an Ethernet Operations, Administration and Maintenance (OAM) network, comprising:
    configuring absolute level indicia associated with an OAM domain hierarchical level of Maintenance End Point (MEP) nodes of said Ethernet OAM network;
    initiating, by at least one of said MEP nodes, an OAM frame having an absolute level indicium of the at least one MEP node initiating the OAM frame and a relative level indicium encoded therein;
    offsetting the OAM frame's relative OAM domain level indicium when the OAM frame traverses from a first OAM domain at one hierarchical level to a second OAM domain at another hierarchical level; and
    when the OAM frame arrives at a particular MIP node, determining said particular MIP node's absolute level indicium based on the OAM frame's absolute level indicium and relative level indicium, wherein said particular MIP node's absolute level indicium is determined to be a value that equals the OAM frame's absolute level indicium when the OAM frame's relative level indicium indicates no hierarchical relative level change and wherein said particular MIP node's absolute level indicium is determined to be a value equaling the OAM frame's absolute level indicium that is offset by the OAM frame's relative level indicium when the OAM frame's relative level indicium indicates a hierarchical relative level change;
    auto-configuring said particular MIP node with said particular MIP node's determined absolute level indicium; and
    after completion of auto-configuration of said particular MIP node, detecting a frame leakage error when a second OAM frame's absolute level indicium equals said particular MIP node's determined absolute level indicium and the second OAM frame's relative level indicium indicates a hierarchical relative level change.

2. The method of configuring MIP nodes disposed in an Ethernet OAM network as recited in claim 1, wherein said absolute level indicia associated with said MEP nodes of said Ethernet OAM network are configured manually.

3. The method of configuring MIP nodes disposed in an Ethernet OAM network as recited in claim 1, wherein said MEP nodes are disposed in a plurality of OAM domains organized in a hierarchical arrangement such that each of said plurality of OAM domains is bounded by a pair of said MEP nodes.

4. The method of configuring MIP nodes disposed in an Ethernet OAM network as recited in claim 1, wherein said MEP nodes belong to a customer-level OAM domain.

5. The method of configuring MIP nodes disposed in an Ethernet OAM network as recited in claim 1, wherein said MEP nodes belong to a service provider-level OAM domain.

6. The method of configuring MIP nodes disposed in an Ethernet OAM network as recited in claim 1, wherein said MEP nodes belong to an operator-level OAM domain.

7. The method of configuring MIP nodes disposed in an Ethernet OAM network as recited in claim 1, wherein the OAM frame includes a Continuity Check frame.

8. The method of configuring MIP nodes disposed in an Ethernet OAM network as recited in claim 1, wherein the OAM frame includes a TraceRoute frame.

9. The method of configuring MIP nodes disposed in an Ethernet OAM network as recited in claim 1, wherein said absolute level indicium is encoded in a payload field of the OAM frame.

10. The method of configuring MIP nodes disposed in an Ethernet OAM network as recited in claim 1, wherein said relative level indicium is encoded in a payload field of the OAM frame.

11. The method of configuring MIP nodes disposed in an Ethernet OAM network as recited in claim 1, wherein said offsetting of said OAM frame's relative level indicium is based on absolute level indicia associated with said hierarchical levels.

12. A method of providing Operations, Administration and Maintenance (OAM) level information in an MIP node configured in an end-to-end Ethernet network having multiple levels of OAM domains, comprising:
receiving by said MIP node an Ethernet frame wherein a first OAM level field in a payload portion of said Ethernet frame is encoded with an absolute OAM level associated with said Ethernet frame's originating OAM domain and wherein a second OAM level field in said payload portion of said Ethernet frame is encoded with a relative OAM level indicative of number of OAM domain levels traversed by said Ethernet frame;
when said Ethernet frame arrives at said MIP node, determining said MIP node's absolute level based on the absolute OAM level and the relative OAM level encoded in said Ethernet frame, wherein determining said MIP node's absolute level includes:
determining said MIP node's absolute level indicium is a value that equals the OAM frame's absolute level indicium when the OAM frame's relative level indicium indicates no hierarchical relative level change; and
determining said MIP node's absolute level indicium is a value equaling the OAM frame's absolute level indicium that is offset by the OAM frame's relative level indicium when the OAM frame's relative level indicium indicates a hierarchical relative level change;
auto-configuring said MIP node with said MIP node's determined absolute level; and
after completion of auto-configuration of said MIP node, detecting a frame leakage error when a second OAM frame's absolute level indicium equals said MIP node's determined absolute level indicium and the second OAM frame's relative level indicium indicates a hierarchical relative level change.

13. The method of claim 12, wherein said originating OAM domain comprises a customer-level OAM domain.

14. The method claim 12, wherein said originating OAM domain comprises a service provider-level OAM domain.

15. The method claim 12, wherein said originating OAM domain comprises an operator-level OAM domain.

16. A network entity configured for an Ethernet Operations, Administration and Maintenance (OAM) network having multiple levels of OAM domains, comprising:
a Maintenance End Point (MEP) interface of the network entity configured as a MEP of a first level of the multiple levels of OAM domains, wherein the MEP interface is operable to:
receive an OAM frame, wherein the OAM frame includes an absolute relative indicium of a source MEP node at a second level of the multiple levels of OAM domains;
encode a relative level indicium in the OAM frame based on the hierarchical relationship of the second level of the source MEP node and the first level of the MEP interface of the network entity; and
a Maintenance Intermediate Point (MIP) interface of the network entity configured as a MIP of the second level of the multiple levels of OAM domains, wherein the MIP interface is operable to:
receive the OAM frame from the MEP interface of the network entity;
determine the absolute level indicium of the MIP interface of the network entity based on the absolute level indicium and the relative level indicium encoded in the OAM frame received by the MIP interface; and
auto-configure the MIP interface of the network entity with the determined absolute level indicium; and
after completion of auto-configuration of the MIP interface of the network entity, detect a frame leakage error when a second OAM frame's absolute level indicium equals the MIP interfaces's determined absolute level indicium and the second OAM frame's relative level indicium indicates a hierarchical relative level change.

17. The network entity in claim 16, wherein the absolute level indicium of the MIP interface is deduced to be a value that equals said OAM frame's absolute level indicium if said OAM frame's relative level indicium is zero.

18. The network entity in claim 16, wherein the absolute level indicium of the MIP interface is deduced to be a value equaling said OAM frame's absolute level indicium that is offset by said OAM frame's relative level indicium.

19. The network entity in claim 16, wherein said absolute level indicium associated with the source MEP node of said Ethernet OAM network is configured manually.

20. The network entity in claim 16, wherein the source MEP node is configured with said absolute level indicia based on hierarchical levels of OAM domains with which said source MEP node is associated.

21. The network entity in claim 20, wherein said source MEP node is associated with a customer-level OAM domain.

22. The network entity in claim 20, wherein said source MEP node is associated with a service provider-level OAM domain.

23. The network entity in claim 20, wherein said source MEP node is associated with an operator-level OAM domain.

24. The network entity in claim 16, wherein said OAM frame includes a Continuity Check (CC) frame.

25. The network entity in claim 16, wherein said OAM frame includes a TraceRoute frame.

26. The network entity in claim 16, wherein said absolute level indicium of the source MEP node is encoded in a payload field of said OAM frame.

27. The network entity in claim 16, wherein said relative level indicium is encoded in a payload field of said OAM frame.

28. A method in a Maintenance Intermediate Node (MIP) in an Ethernet Operations, Administration and Maintenance (OAM) network having multiple levels of OAM domains, comprising:
receiving an OAM frame by the MIP node, wherein the OAM frame includes a source absolute level indicia associated with a first level of the multiple levels of OAM domains of a source Maintenance End Point (MEP) node and wherein the OAM frame includes a relative level indicium which is incremented by at least one boundary MEP node when the OAM frame is transmitted to another higher level OAM domain;
determining an absolute level indicium of the MIP node based on the source absolute level indicium associated with the first level of the multiple levels of OAM domains of the source MEP node and the relative level indicium in the OAM frame, wherein determining an absolute level indicium includes:

determining the MIP node's absolute level indicium is a value that equals the OAM frame's source absolute level indicium when the OAM frame's relative level indicium indicates no hierarchical relative level change; and determining the MIP node's absolute level indicium is a value that equals the OAM frame's source absolute level indicium offset by the OAM frame's relative level indicium when the OAM frame's relative level indicium indicates a hierarchical relative level change;

auto-configuring by the MIP node its determined absolute level indicium; and upon completion of auto-configuration of the MIP node, detecting a frame leakage error when a second OAM frame's absolute level indicium equals the MIP node's determined absolute level indicium and the second OAM frame's relative level indicium indicates a hierarchical relative level change.

29. The method of claim 28, wherein the relative level indicium in the OAM frame is incremented by the at least one boundary MEP node when the OAM frame is transmitted to the another higher level OAM domain and is decremented by at least another boundary MEP node when the OAM frame is transmitted to another lower level OAM domain.

* * * * *